3 Sheets—Sheet 1.

G. H. CLEMENS.
Clamping-Hub.

No. 198,188. Patented Dec. 18, 1877

Attest
Anthony Ames
Ferdinand S. Clemmons

Inventor
G. H. Clemens
by his Attorney
Henry N. Clemons

G. H. CLEMENS.
Clamping-Hub.

No. 198,188.    Patented Dec. 18, 1877

3 Sheets—Sheet 3.

G. H. CLEMENS.
Clamping-Hub.

No. 198,188. Patented Dec. 18, 1877.

N. PETERS, PHOTO-LITHOGRAPHER, WASHINGTON, D. C.

UNITED STATES PATENT OFFICE.

GILBERT H. CLEMENS, OF SPRINGFIELD, MASSACHUSETTS, ASSIGNOR OF ONE-HALF HIS RIGHT TO GEORGE F. CLEMENS AND HENRY N. CLEMENS, OF SAME PLACE.

IMPROVEMENT IN CLAMPING-HUBS.

Specification forming part of Letters Patent No. 198,188, dated December 18, 1877; application filed April 25, 1877.

*To all whom it may concern:*

Be it known that I, GILBERT H. CLEMENS, of the city of Springfield, in the county of Hampden and State of Massachusetts, have invented a Clamping-Hub for Shaft-Couplings, Pulleys, &c., of which the following is a specification:

My invention consists in a clamping-hub, adapted to fasten shaft-couplings, pulleys, gears, wheels, cranks, &c., to shafts or axles, by parting transversely and longitudinally the inner portion of the hub, to form separate shaft-griping sections, and connecting the parted portions independently to a solid periphery or rim of the hub by sections of radially-inclined or dishing webs, heads, flanges, or arms, adapted suitably with screw-bolts or their equivalents, for the forcing or springing inwardly or outwardly of the inclined web-sections or arms, so as to compress and force together the parted inner portions of the hub, and reduce their bore sufficiently to gripe and clamp the shaft or axle with them, and thereby fasten the shaft-couplings, pulleys, &c., on their shafts or axles.

The accompanying drawings are comprised in Sheets Nos. 1, 2, and 3, and form part of this specification.

Figure 1:
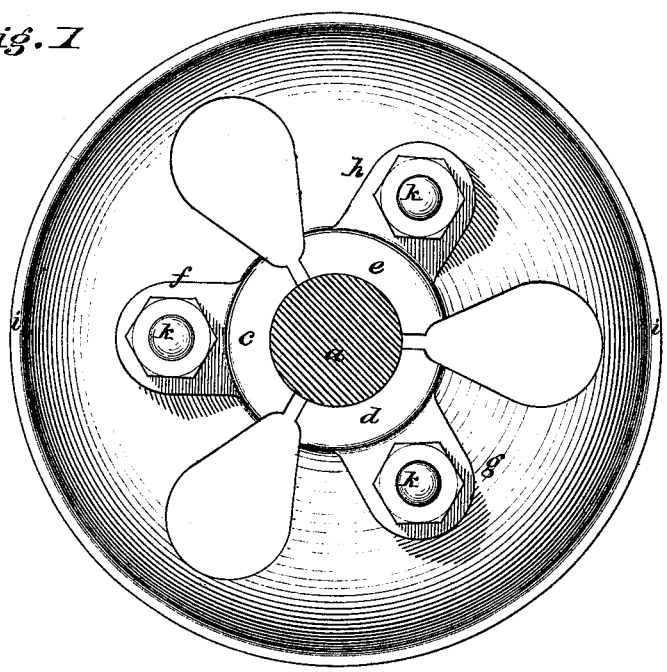
Figure 2:
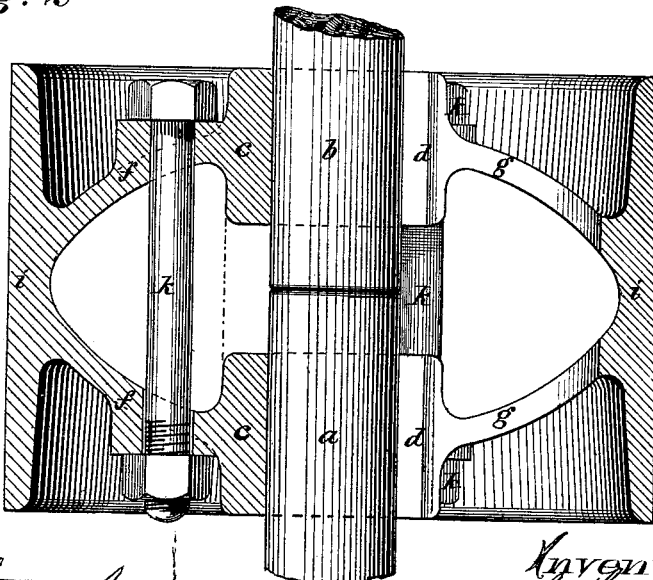
Figure 3:
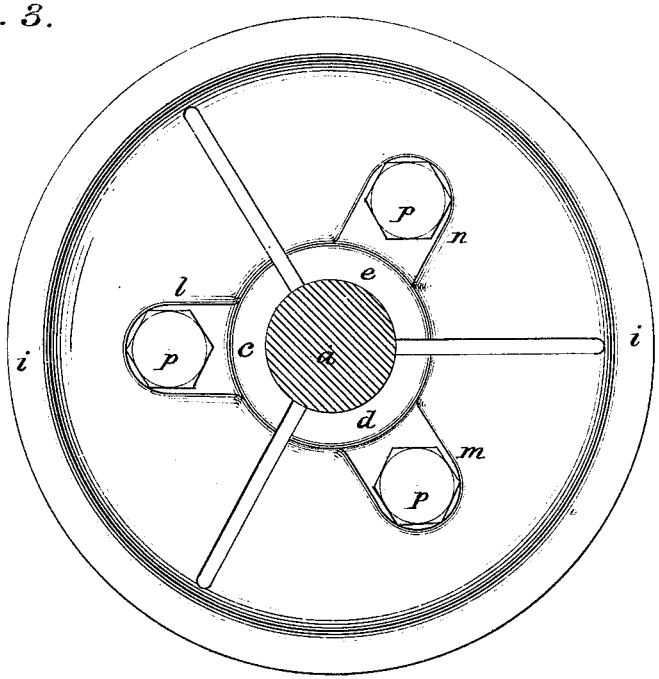
Figure 4:
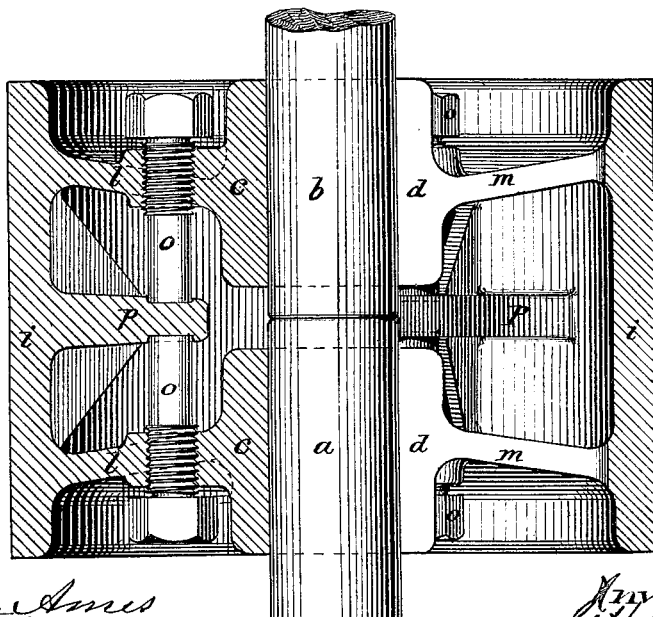
Figure 5:
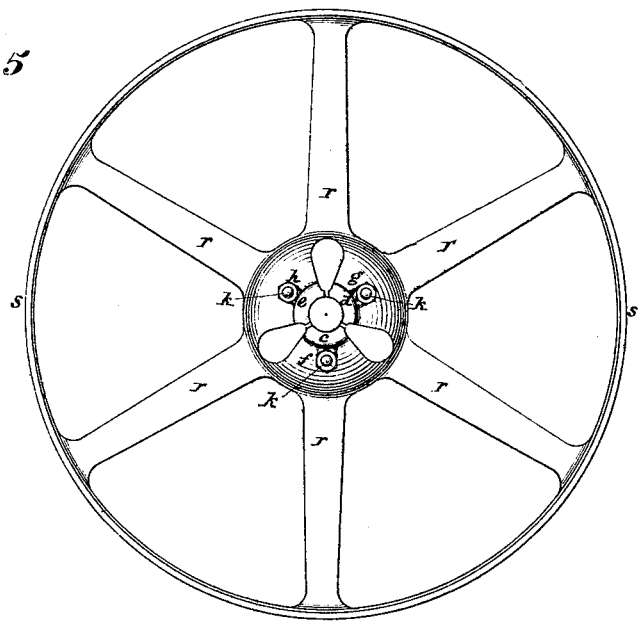
Figure 6:
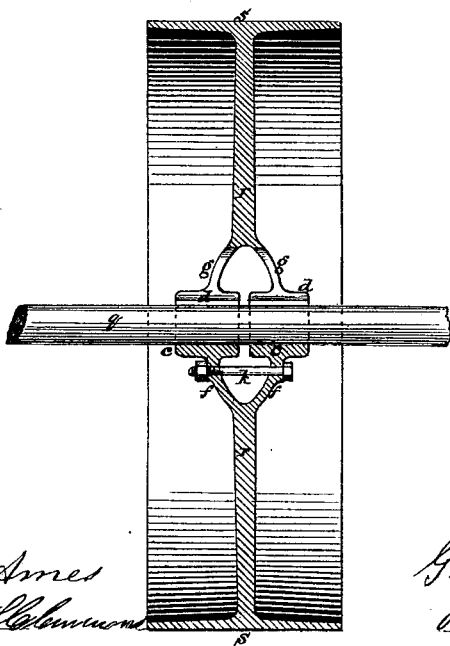

Figures 1 and 2 show, by an end view and a longitudinal central section, a shaft-coupling with the internal clamping-hub adapted to clamp the ends of two shafts simultaneously by inward movement of the flexible inclined web-sections. Figs. 3 and 4 show, by similar views, a shaft-coupling with the internal clamping-hub adapted to clamp the ends of two shafts independently by outward movement of the inclined web-sections. Figs. 5 and 6 show the same internal hub-clamping device as that of Figs. 1 and 2, as adapted to the hubs of pulleys, gears, &c., for fastening them to shafts or axles.

In all the figures of the drawings like letters refer to like parts of the devices shown.

In Figs. 1 and 2, the shaft-coupling is shown coupling together the contiguous ends of two straight shafts, $a$ and $b$. The internal portion of the hub of the coupling is divided transversely into two sections, to clamp separately the two shaft ends, and each hub-section is parted longitudinally by three equidistant cuts, subdividing each of the two hub-sections into three equal and opposite portions, $c\ d\ e$, this subdivision being preferred to a greater or less one. Each of these hub portions are independently connected to like sections, $f\ g\ h$, of a double web or flange, made continuous and solid at its periphery, and having formed upon it a circular rim, $i$.

The web-sections are made in curved planes, inclined from radial lines to the shaft's axis, and lie oppositely in pairs, $f\ f\ g\ g\ h\ h$, and each pair has a screw-bolt, $k$, passing through it. By tightening the bolts, the oppositely-inclined web-sections or arms, being flexible, are sprung together to a less angle of inclination to radial lines from the shaft-axis, forcing the hub-sections to which they are connected together toward their shafts, and reducing their bore, causing them to gripe and clamp their shafts simultaneously with a powerful force of compression, resulting from the combined screw-power and knee-lever action of the screw-bolts and inclined web-sections, thus securely coupling the shafts $a$ and $b$ together.

The web-sections may be forced together and the parted hub-sections made to gripe and clamp their shafts by other means than by the bolts $k\ k$; as, for example, by means of collars, rings, or nuts on the shafts, adapted suitably with screws, keys, or levers, to bear against the ends of the hub-sections and force them together.

In the shaft-coupling combination shown in Figs. 3 and 4 the hub is parted transversely and longitudinally, and the three opposite pairs of hub-sections $c\ c\ d\ d\ e\ e$ are connected by opposite pairs of web-sections $l\ l\ m\ m\ n\ n$ to the solid periphery or rim $i$ of the double webs, similarly as before described of Figs. 1 and 2. But the webs incline inward in place of outward, as before, and require to be forced outward in place of inward, in order to force the hub-sections together and clamp the shafts, which is done by screw-bolts $o\ o\ o$, screwing through the web-sections at each end of the coupling, and abutting oppositely against fixed lugs $p\ p\ p$ of the rim $i$. By this described modified form of the shaft-coupling, the two shaft ends are clamped independently instead of simultaneously, as before, which is advantageous in some cases.

By dispensing with the abutment-lugs p p p, and also the three screw-bolts and screw-holes at one end of the coupling, and making the three screw-bolts of the opposite end of sufficient length to reach through from web to web, thus screwing through one web and abutting against the other, the device may be used to clamp both shaft ends simultaneously, as in Figs. 1 and 2, but by reverse movement of the reversely-inclined web-sections.

The internal hub-clamping device shown and described of Figs. 1 and 2 (and also its modified forms shown and described of Figs. 3 and 4) is obviously applicable for making internal-clamping hubs of pulleys, gears, wheels, cranks, &c. The mode of their application for these said purposes is illustrated in Figs. 5 and 6, which show a pulley adapted with an internal-clamping hub of the form of the clamp-coupling hub shown in Figs. 1 and 2. The pulley-hub has its internal portion made in two sections, each cut longitudinally into three equal parts, c d e, which are independently connected, by like web-sections f g h, to a solid web periphery or hub-rim, and which are clamped upon the shaft q by the screw-bolts k k k passing through and forcing together the web-sections, the whole forming a hollow hub, with internal shaft-griping subdivisions, carried and clamped by the inclined and compressible web-sections, from the solid periphery of which spring the pulley-arms r r, carrying the pulley-rim s.

I claim as my invention—

1. A clamping-hub adapted for fastening shaft-couplings, pulleys, &c., to shafts and axles by means of internal shaft-griping hub-sections, separated by transverse and longitudinal cuts or partings, and connected independently to radially-inclined web-sections or arms, which are joined to or formed within an exterior hub rim or periphery, and which are provided with screw-bolts or their described equivalents, adapted to force or spring the inclined web-sections or arms to a less angle of inclination to their shaft's axes, so as to force and compress together the internal hub-sections and reduce their bore, and thus to clamp and gripe them on their shafts or axles, substantially as set forth.

2. In a clamping-hub for fastening shaft-couplings, pulleys, &c., to shafts or axles, in which are employed internal shaft-griping hub-sections, the described mode of clamping said hub-sections upon their shafts or axles, by means of radially-inclined web-sections or arms connecting the hub-sections to an exterior hub rim or periphery, and operating substantially as set-forth.

G. H. $\underset{\text{mark.}}{\overset{\text{his}}{\times}}$ CLEMENS.

Witnesses:
F. T. CLARK,
A. H. MELLVISH, M. D.